(12) United States Patent
Strezo et al.

(10) Patent No.: US 11,418,509 B2
(45) Date of Patent: Aug. 16, 2022

(54) CLOUD ARCHITECTURE TO SECURE PRIVACY OF PERSONAL DATA

(71) Applicant: Acxiom LLC, Conway, AR (US)

(72) Inventors: Larry Strezo, Elmhurst, IL (US); David Scott, Maumelle, AR (US); John Riewerts, Pflugerville, IL (US); Blake Reed, Conway, AR (US); Vineet Saini, Conway, AR (US)

(73) Assignee: Acxiom LLC, Conway, AR (US)

( * ) Notice: Subject to any disclaimer, the term of this patent is extended or adjusted under 35 U.S.C. 154(b) by 491 days.

(21) Appl. No.: 16/719,435

(22) Filed: Dec. 18, 2019

(65) Prior Publication Data

US 2021/0044588 A1 Feb. 11, 2021

Related U.S. Application Data

(60) Provisional application No. 62/884,005, filed on Aug. 7, 2019.

(51) Int. Cl.
*H04L 9/40* (2022.01)
*G06F 21/62* (2013.01)
*G06F 9/54* (2006.01)
*G06F 16/21* (2019.01)
*G06F 16/25* (2019.01)
(Continued)

(52) U.S. Cl.
CPC ............ *H04L 63/10* (2013.01); *G06F 9/54* (2013.01); *G06F 16/21* (2019.01); *G06F 16/252* (2019.01); *G06F 21/6245* (2013.01); *G06F 2221/2101* (2013.01); *H04L 12/4641* (2013.01); *H04L 41/0893* (2013.01); *H04L 41/0895* (2022.05); *H04L 63/0272* (2013.01)

(58) Field of Classification Search
CPC . H04L 64/10; H04L 63/0272; H04L 12/4641; H04L 12/4625; H04L 41/0895; H04L 41/0893
See application file for complete search history.

(56) References Cited

U.S. PATENT DOCUMENTS 8,589,179 B2 11/2013 Rosenberger et al.
8,984,595 B2 3/2015 Cluck et al.
(Continued)

OTHER PUBLICATIONS

Judson, B., Vander Werf, M., & Brenner, P. (2018). whole document, Compliant Cloud+Campus Hybrid HPC Infrastructure. https://sc18.supercomputing.org/proceedings/workshops/workshop_files/ws_hpcsysp108s3-file1.pdf retrieved from Internet Jun. 14, 2022 (Year: 2018).*

(Continued)

*Primary Examiner* — Tom Y Chang

(57) ABSTRACT

A cloud-based storage architecture provides for the isolation of client data in a distributed manner using a hub-and-spoke account mechanism within the cloud. Individual client data is securely isolated while still providing a master account with access to all data, including providing access from common applications to all of the data. Thus complete client isolation is achieved while simultaneously sharing the code necessary to process the data in the cloud. A separate client account may be maintained for data stored at separate physical locations, such as may be required under various privacy laws and regulations; in this manner, no data is required to leave a specified geopolitical location in order for processing to occur.

17 Claims, 2 Drawing Sheets

(51) Int. Cl.
  *H04L 41/0895* (2022.01)
  *H04L 12/46* (2006.01)
  *H04L 41/0893* (2022.01)

(56) References Cited

U.S. PATENT DOCUMENTS

| | | |
|---|---|---|
| 9,128,626 B2 | 9/2015 | Chako |
| 9,137,304 B2 | 9/2015 | Lucent |
| 9,230,284 B2 | 1/2016 | Whitton et al. |
| 9,825,905 B2 | 11/2017 | Thakkar et al. |
| 10,085,640 B2 | 10/2018 | Mensinger et al. |
| 10,628,228 B1 * | 4/2020 | Theunissen ......... H04L 43/0876 |
| 2014/0115137 A1 | 4/2014 | Keisam |
| 2017/0286517 A1 * | 10/2017 | Horowitz ............ G06F 11/0754 |
| 2018/0063176 A1 * | 3/2018 | Katrekar ................ H04L 43/10 |

OTHER PUBLICATIONS

Amazon Web Services, Nov. 26, 2018, whole document, Amazon VPC AWS Transit Gateway. https://sc18.supercomputing.org/proceedings/workshops/workshop_files/ws_hpcsysp108s3-file1.pdf retrieved from Internet Jun. 14, 2022 (Year: 2018).*
Cloud Security Alliance, "Security Guidance for Critical Areas of Focus in Cloud Computing v.4.0" (2017).

* cited by examiner

| Allows UDL Control to talk to Spokes and Shared Services Associated to UDL Control account | | | 50 |
|---|---|---|---|
| Name of Transit GW RT | CIDR | Attached to VPC of | |
| udl-control-2-shared-n-spoke | 10.0.0.0/21 | Shared Services | |
| udl-control-2-shared-n-spoke | 10.0.16.0/21 | client-1 | 52 |
| udl-control-2-shared-n-spoke | 10.0.24.0/21 | client-2 | |

| Allows Shared Services Account to talk to UDL Control and Spokes Associated with Shared Services account | | | 54 |
|---|---|---|---|
| Name of Transit GW RT | CIDR | Attached to VPC of | |
| shared-2-spoke-n-udl-control | 10.0.8.0/21 | UDL Control | |
| shared-2-spoke-n-udl-control | 10.0.16.0/21 | client-1 | |
| shared-2-spoke-n-udl-control | 10.0.24.0/21 | client-2 | |

| Allows Spokes to talk to Shared Services and UDL Control Account Assoicated with each client account | | | 56 |
|---|---|---|---|
| Name of Transit GW RT | CIDR | Attached to VPC of | |
| spoke-2-shared-n-udl-control | 10.0.0.0/21 | Shared Services | |
| spoke-2-shared-n-udl-control | 10.0.8.0/21 | UDL Control | |

FIG. 2

CLOUD ARCHITECTURE TO SECURE PRIVACY OF PERSONAL DATA

CROSS-REFERENCE TO RELATED APPLICATIONS

This application claims the benefit of U.S. provisional patent application No. 62/884,005, entitled "Hub-and-Spoke Architecture within a Cloud Environment to Secure Privacy of Personal Data," filed on Aug. 7, 2019. Such application is incorporated herein by reference in its entirety.

STATEMENT REGARDING FEDERALLY SPONSORED RESEARCH OR DEVELOPMENT

Not applicable.

BACKGROUND OF THE INVENTION

Retailers and marketers today spend considerable sums of money building marketing databases, with these databases often times containing data records pertaining to millions of consumers. In many cases, these retailers and marketers may work with marketing service providers to maintain, store, and/or manage the large amount of data records associated with their customers. With the modernization of technology, cloud storage of these data records is becoming increasingly common. In this model, the marketing service provider manages a database that stores the data records for up to an unlimited number of individual clients. But as concerns about privacy increase and the monetary value of data continues to grow, the ability to protect client data is of utmost importance when clients choose to develop business relationships with marketing service providers.

In addition, various legal jurisdictions around the world have begun implementing regulations that govern the storage and use of personally identifiable data (PII) about their citizens. One of these regulations is the General Data Protection Regulation (GDPR) that pertains to EU residents. Among its other changes, the GDPR limits the ability of a data controller or processor to move PII about its citizens outside of their home jurisdiction to a jurisdiction where the GDPR may not apply. Thus a marketing services provider that maintains data pertaining to EU residents may not simply store data "in the cloud" without directing and monitoring the physical location of the servers and related equipment where such data is stored. As the number of such regulations increase, the level of care and control that a marketing services provider must exercise over data that it stores outside of its firewalls must increase as well, or the marketing services provider will face penalties for noncompliance.

Currently, one of the leading cloud platforms is Amazon Web Services (AWS), which offers a variety of cloud computing services. AWS boasts that it has the largest and most dynamic cloud ecosystem, with millions of active customers and tens of thousands of partners globally. AWS allows for the secure storage of files and data on the cloud, accessible from any location with an Internet connection. In order to access the services offered and the data stored, an AWS account accessible by the particular user (such as the marketing services provider) is associated with the particular services and data. The AWS account owner is given access to and control of the data associated with the particular AWS account. To upload data to AWS, an S3 bucket is created and any number of objects can be uploaded to that bucket. Currently, AWS allows for the creation of up to one hundred S3 buckets per AWS account, but that number can be increased with AWS permission.

For organizations like marketing services providers who work with many clients, a single AWS account associated with the marketing service provider may have access to the data of many different clients. AWS Landing Zone allows for the creation of a multi-account AWS environment. Existing data management for this scenario, where a single marketing service provider has access to the data of many different clients, results in a single AWS account associated with the marketing service provider giving full access to all of the client data of that account to any person who has administrative access to the AWS account. This situation is a security concern because someone who needs only data for a single particular client may gain access to data for all other clients. In addition, this approach risks comingling of separate client data. However, creating separate AWS accounts for each client may not be feasible, because while the individual client data should not be comingled, there are shared services or application programs that process client data, and therefore the client data of all clients must be accessible by the shared services or application programs. Therefore, what is needed is a cloud-based data management architecture that both provides the necessary access but also provides safeguards against unintentional loss of data. In addition, this architecture must be structured in such a manner that it facilitates compliance with the GDPR and all other applicable regulations that pertain to the storage of data, including limitations concerning the jurisdiction where physical equipment storing that data are located.

References mentioned in this background section are not admitted to be prior art with respect to the present invention.

BRIEF SUMMARY OF THE INVENTION

The present invention is directed to a cloud-based storage architecture that allows the isolation of client data in a distributed manner via a hub-and-spoke account mechanism within the cloud. The present invention provides a mechanism by which individual client data is securely isolated while still providing a master account with access to all data, including providing access from common applications to all of the data. Thus complete client isolation is achieved while simultaneously sharing the code necessary to process the data in the AWS cloud or other cloud provider.

It may be seen that the present invention substantially reduces or eliminates the possibility of commingling of multiple clients' data, and secures the client data so that access to individual clients' data is carefully controlled and monitored, but also allows for a central hub for programs and services that are shared by clients and that have access to all required data. The present invention further facilitates and simplifies compliance with the GDPR and similar regulations.

These and other objects, features, and advantages of the present invention will become better understood from a consideration of the following detailed description of the preferred embodiments in conjunction with the drawings as described following:

BRIEF DESCRIPTION OF THE SEVERAL VIEWS OF THE DRAWINGS

FIG. 2 is a chart showing transit gateway route tables according to an implementation of the present invention.

DETAILED DESCRIPTION OF THE INVENTION

Figure 1:
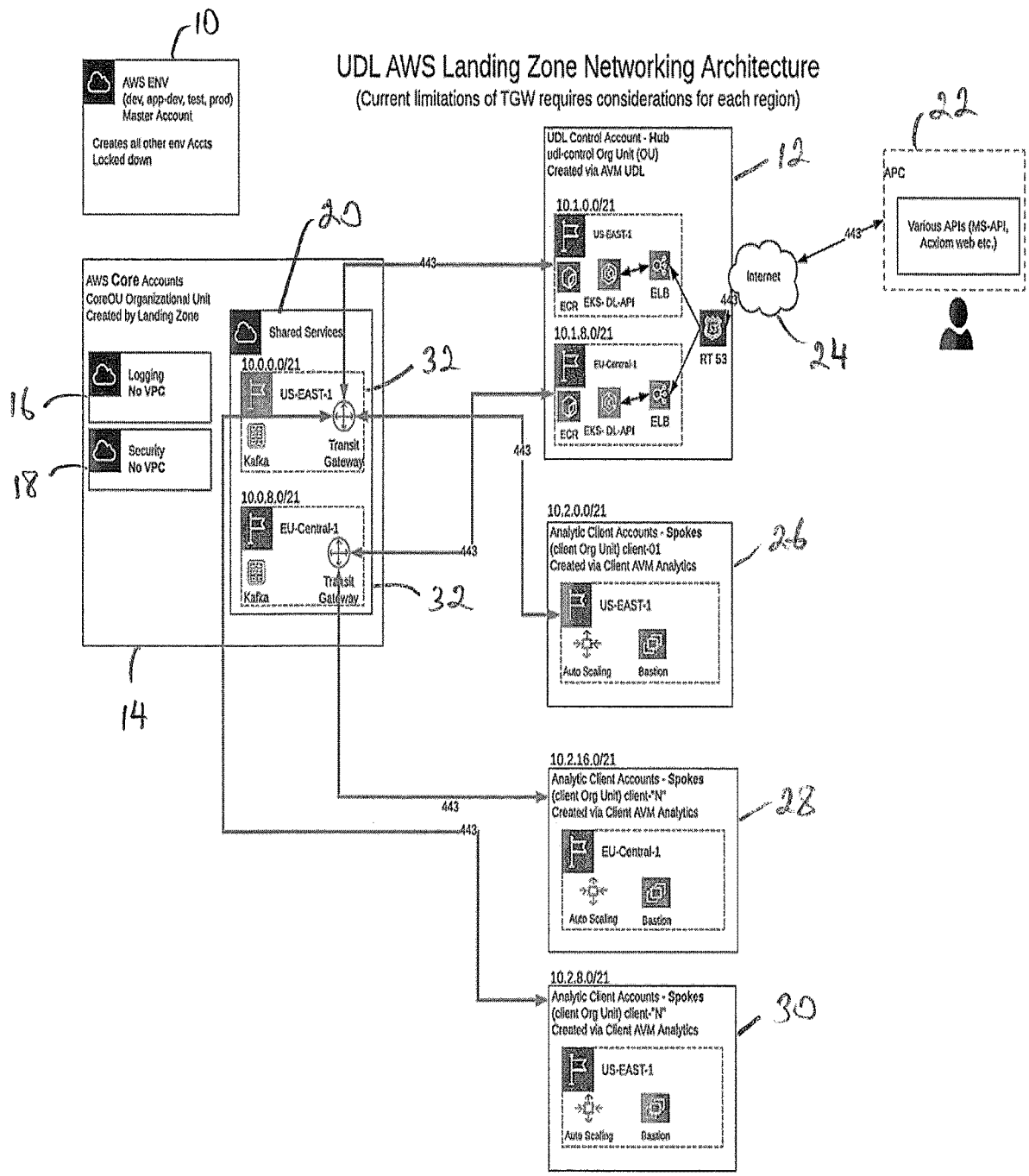
FIG. 1 is a diagram of a networking architecture according to an implementation of the present invention.

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

The present invention in various embodiments is directed to a database architecture that allows the isolation of client data in a distributed manner via a hub-and-spoke account mechanism within the cloud. For purposes of describing the invention, the term "client" may be used to describe the owner of one or more data records (and most likely millions of data records). In certain embodiments, the data records may contain information associated with one or more consumers. The term "data master" may refer to a person or entity (such as, for example, a marketing services provider) whose obligations including storing, managing, or processing the client data for multiple clients. Thus, it may be seen that a data master has access to or otherwise controls a large amount of client data, portions of which belong to individual clients.

As indicated, one of the benefits of the present invention is that it allows for the management of client data from multiple individual clients without the improper comingling of such data. Furthermore, the present invention provides security protocols for giving access to a particular client's data only to authorized parties. Still, in order to effectively provide services, it may be seen that the data master needs access to all client data simultaneously such that various processes or services that are to be shared by multiple clients can be provided. To accomplish these goals, the present invention provides a hub and spoke account mechanism within a cloud environment, including but not limited to an AWS cloud in a particular embodiment.

The architecture described herein provides for a Master Account, a Uniform Data Layer (UDL) Control Account, several supporting accounts (which may be referred to collectively herein as "Core Accounts"), and a separate client account for every client (these accounts may be referred to herein as "Analytic Client Accounts"). Access to the Core Accounts and Analytic Client Accounts are on an individual basis, and such access does not provide access to the data or content associated with a non-accessed sub-account. Instead, in order to access the content by all the sub-accounts, the Master Account must be accessed and various security protocols must be followed before such access allows for access to the sub-account data. For example, to access the data of the sub-accounts, the requesting party must gain access to the Master Account, gain access to the email account associated with the Master Account, and have knowledge of the entire system. Even if such master access is achieved, the present invention includes controls that create alerts when such access occurs.

The Master Account itself is created within AWS in one particular implementation of the invention, according to the account creation protocols required by the AWS system. Access to this Master Account is limited to authorized users and to access the authentication of the requester's identity may be required. For example, okta access protocols provided by Okta, Inc. of San Francisco, Calif. may be implemented. A single sign-on (SSO) authentication process may be implemented, or alternatively, a multi-factor authentication protocol may be incorporated. Access to the Master Account may be provided, for example, to trusted employees of the data master. All other accounts (the UDL Control Account, Core Accounts, and Analytic Client Accounts) are created from the Master Account.

AWS Landing Zone allows for the creation of a multi-account AWS environment. Using such architecture, a baseline set of Core Accounts can be generated: one for security, one for shared services, and one for logging. The Shared Services Account is the place for services that are used by all other sub-accounts, the Security Account is for receiving notifications related to security, and the Logging Account is the central landing place for logs (such as audit logs). FIG. 1 shows one exemplary implementation of the invention. Master account 10 is created in order to control all other accounts. Core Accounts 14 include Logging Account 16, Security Account 18, and Shared Services Account 20. Shared Services Account 20 is in communication with UDL Control Account 12 and in this case three Analytic Client Accounts 26, 28, and 30. Analytic Client Account 26 stores data for client 01 at the physical location US-EAST-1. Analytic Client Accounts 28 and 30 are both for data belonging to client N, but are separate because the data is physically stored in different geopolitical locations in order to comply with privacy regulations. Analytic Client Account 28 is for data stored in the EU-Central-1 location, while Analytic Client Account 30 is for data stored in the US-EAST-1 location. Applications can reach the system through APIs 22, which communicate with UDL Control Account 12 across network 24, which may be the Internet.

At least one transit gateway 32 is incorporated into the Shared Services Account 20 to allow the shared services account to communicate with all other accounts. There will be a number of transit gateways equal to the number of geopolitical regions in which data is collected on regional data storage buckets. For example, in FIG. 1 there are two transit gateways 32 in Shared Services Account 20 because there are two regions in which data is stored, namely, US-EAST-1 and EU-Central-1. Suppose then a new region EU-West-1 were added. In the UDL Control account 12, all of the resources (Kubernetes, running programs, etc.) would be duplicated for that new region with an entirely new EU-West-1 virtual private cloud (VPC). Within the shared services account 20 the new transit gateway 32 and its route tables would also get duplicated within the entirely new EU-West-1 VPC. The clients in EU-West-1 would communicate to UDL Control's EU-West-1 applications via this transit gateway 32. The data, even if transient, would stay within the appropriate region. Transit gateway attachments are utilized, one associated with each client so that the shared services account can communicate with each and every Analytic Client Account, such as accounts 26, 28, and 30.

The UDL Control Account 12 is defined to house the UDL Datalake code within Kubernetes clusters. Access to these programs is programmatic and limited to other UDL programs. This UDL Control Account 12 is also home to the programs (applications) used by each client located in Node JS JAR files that will exist within an S3 bucket owned by the UDL Control Account. Because these programs are used by each client, the present invention includes a protocol that allows all accounts to read the UDL bucket including these programs. The UDL Control Account 12 may also be in communication via an Internet connection 24 with various APIs 22 owned or controlled by the data master. A transit gateway attachment is incorporated into the UDL Control Account 12 to allow the account to communicate with all other accounts, as described more fully below. In particular, multiple transit gateway attachments are utilized, one associated with each client so that the account can communicate with each and every Analytic Client Account, such as client accounts 26, 28, and 30. In one embodiment, the UDL Control Account 12 is in communication with the Analytic Client Accounts through the transit gateway 32 of the Shared Services Account 20.

Analytic Client Accounts are created for each client, making use of private S3 buckets for that particular client's data. In the example of FIG. 1, there are three such accounts, 26, 28, and 30. These Analytic Client Accounts can be created in the particular region of the world where the particular client's data originates (for example, US-EAST vs EU-Central), ensuring compliance with various privacy laws in place around the world, such as the European GDPR. Unlike with the UDL Control Account 12, where the S3 bucket is able to be read by all accounts, the bucket for a particular client account is only accessible by that Analytic Client Account. This ensures that the data owned by that client is not accessible by another client without permission. In other words, while the UDL Control Account 12 and the Shared Services Account 20 are in communication with all other accounts, each Analytic Client Account can only communicate with the UDL Control Account 12 and Shared Service Account 20 but cannot communicate with the other Analytic Client Accounts. In this regard, the UDL Control Account 12 acts as the hub and the Analytic Client Accounts act as the spokes, with the Shared Services Account 20 and other Core Accounts 14 providing services to the hub and spoke mechanism.

FIG. 2 provides a table 50 showing the manner in which different accounts may talk to each other in order to implement the communication controls described above. Referring to sub-table 52, it may be seen that UDL Control Account 12 may communicate with Shared Services Account 20 and the Analytic Client accounts as previously described. Sub-table 54 shows that Shared Services Account 20 may, conversely, communicate with the UDL Control Account 12 and the Analytic Client Accounts. Sub-table 56 shows how the "spokes" of the Analytic Client accounts may communicate with the Shared Services Account 20 and the UDL Control Account 12; importantly, however, the individual Analytic Client accounts have no mechanism by which they may communicate with each other.

The following chart of Table I provides a list of cloud formation templates used in an embodiment of the invention in the AWS environment, along with the components created within them and the descriptions of those components:

TABLE I

| Cloud Formation Template Name | Type of Component Created | Description of Component |
|---|---|---|
| aws-lz-UDLControl.template.yaml | AWS::S3::BucketPolicy | Policy to allow all accounts to read the Datalake bucket |
| | AWS::ECR::Repository | Repository to hold Datalake Docker images |
| | AWS::IAM::User | User only granted permission to work with ECR Repository |
| | AWS::IAM::AccessKey | Key for ECR User |
| | AWS::Lambda::Function | TGW-Create_Route: Program used to create network routes via the transit gateway |
| | AWS::IAM::Role | This role used to execute the Lambda function to create network routes via the transit gateway |
| | AWS::Lambda::Function | BastionCreateKeyPair-Program used to create a key that allows access to a Bastion Host necessary for the setup of the Datalake API programs |
| | Custom::KeyPair | The invocation of the BastionCreateKeyPair program used to create the keys |
| | AWS::S3::Bucket | The regional Datalake bucket used to hold program files |
| | AWS::EC2::TransitGatewayAttachment | An attachment that allows this account to talk to the shared services account's TransitGateway. This gateway is set up in such a way that this account can communicate with all other accounts |
| | AWS::IAM::Group | Security group that allows access to the ECR Repository that holds the Docket image of UDL DL-API |
| aws-lz-client-analytics.template.yaml | AWS::EC2::Route | Route1ToTGW4UDLControl: used to create network routes via the transit gateway |
| | AWS::IAM::Role | The role used to execute the Lambda function to create network routes via the transmit gateway |

TABLE I-continued

| Cloud Formation Template Name | Type of Component Created | Description of Component |
|---|---|---|
| | AWS::Lambda::Function | BastionCreateKeyPair-Program used to create a key that allows access to a Bastion Host necessary for the setup of the Datalake API programs |
| | Custom::KeyPair | The invocation of the BastionCreateKeyPair program used to create the keys |
| | AWS::S3:::Bucket | The regional Datalake bucket used to hold program files |

It will be seen then that the transit gateway route tables are used to properly distribute the data, as listed in FIG. 2. A Transit Gateway Route Table named "shared-2-spoke-n-udl-control" has an association created for the shared services account and propagations to each client/spoke, and a propagation to the UDL Control Account 12. A Transit Gateway Route Table named "udl-control-2-shared-n-spoke" has an association created for the UDL Control Account 12 and propagations to each client/spoke, and a propagation to the Shared Services Account 20. A Transit Gateway Route Table named "spoke-2-shared-n-udl-control" has an association created for each client/spoke account and propagations to each of the Shared Service Account 20 and the UDL Control Account 12.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification. When "about," "approximately," or like terms are used herein, they are intended to include amounts, measurements, or the like that do not depart significantly from the expressly stated amount, measurement, or the like, such that the stated purpose of the apparatus or process is not lost.

The invention claimed is:
1. A cloud-implemented database, comprising:
 a. a master account;
 b. a control account implemented as a sub-account of the master account;
 c. at least one control account storage bucket communicationally connected to the control account, wherein the control account is configured to control access to the control account storage bucket, and wherein the control account storage bucket comprises one or more data applications;
 d. a plurality of core accounts, each of the plurality of core accounts implemented as a sub-account of the master account, and wherein at least one of the plurality of core accounts is a shared services account;
 e. a plurality of client accounts, wherein each of the plurality of client accounts is implemented as a sub-account of the master account;
 f. a plurality of client account storage buckets each communicationally connected to one of the client accounts, wherein each client account is configured to control access to the client account storage bucket to which it is connected, wherein each client account storage bucket comprises client data collected in a geopolitical region where the client account storage bucket is physically present, and further wherein at least two of the client account storage buckets are present in two distinct geopolitical regions;
 wherein the shared services account comprises a plurality of transit gateways, wherein each of the plurality of transit gateways communicationally connects the shared services account with those of the plurality of client account storage buckets physically present in the same geopolitical region, and further wherein the one or more data applications stored in the control account data bucket are accessible at each of the plurality of client accounts.

2. The system of claim 1, wherein the plurality of core accounts comprise a security core account configured to receive security notifications.

3. The system of claim 2, wherein the plurality of core accounts comprise a logging account configured to house audit logs.

4. The system of claim 1, further comprising at least one application programming interface (API) communicationally connected to the control account.

5. The system of claim 1, wherein the control account comprises a plurality of transit gateway attachments, each of which are communicationally connected to one of the plurality of client accounts.

6. The system of claim 1, wherein the control account storage bucket comprises a copy of each of the applications in the control account storage bucket for each different geopolitical region in which one of the client account storage buckets is physically present.

7. The system of claim 6, wherein the copies of the application in the control account storage bucket for each different geopolitical region and the corresponding client account storage buckets for that geopolitical region are combined in a virtual private cloud (VPC).

8. The system of claim 1, wherein the plurality of client accounts are configured to prevent any data in an associated client account storage bucket from being read from or transferred outside of the geopolitical region in which such associated client account storage bucket is located.

9. The system of claim 1, wherein the shared services account further comprises a plurality of transit gateway route tables configured to direct communications between the shared services account and the plurality of client accounts and between the control account and the plurality of client accounts.

10. A method for building a database in a cloud environment, comprising the steps of:
 a. creating a master account in the cloud environment;
 b. creating a control account as a sub-account of the master account;
 c. communicationally connecting a control account storage bucket with the control account;
 d. hosting one or more data applications in the control account storage bucket;
 e. configuring the control account to control access to the control account storage bucket;
 f. creating a shared services account as a sub-account of the master account;
 g. creating a plurality of client accounts each as a sub-account of the master account;
 h. communicationally connecting each of the plurality of client accounts to one of a plurality of client account storage buckets, wherein each client account storage bucket comprises client data collected in a geopolitical region where the client account storage bucket is physically located;
 i. configuring each of the plurality of client accounts to control access to a connected one of the plurality of client account storage buckets;
 j. communicationally connecting the one or more data applications in the control account storage bucket to each of the plurality of client accounts;
 k. communicationally connecting the shared services account to each of the client accounts; and
 l. configuring the client accounts to prevent communication between any two of the plurality of client accounts.

11. The method of claim 10, further comprising the step of configuring each of the plurality of client account storage buckets to prevent communication of data stored in each of the plurality of client account storage buckets outside of the geopolitical region in which such one of the plurality of client account storage buckets is located.

12. The method of claim 11, further comprising the step of creating a security core account configured to receive security notifications.

13. The method of claim 12, further comprising the step of creating a logging account configured to receive and house audit logs.

14. The method of claim 11, further comprising the step of communicationally connecting at least one application programming interface (API) to the control account, wherein each API is associated with an external application.

15. The method of claim 14, further comprising the step of creating a copy of each of the applications in the control account storage bucket for each different geopolitical region in which one of the client account storage buckets is physically present.

16. The method of claim 15, further comprising the step of creating a virtual private cloud (VPC) for each copy of the application in the control account storage bucket for each different geopolitical region and the corresponding client account storage buckets for that geopolitical region.

17. The method of claim 11, further comprising the step of creating a plurality of transit gateway route tables at the shared services account configured to direct communications between the shared services account and the plurality of client accounts and between the control account and the plurality of client accounts.

* * * * *